United States Patent
Nehls

(10) Patent No.: US 10,415,616 B2
(45) Date of Patent: Sep. 17, 2019

(54) ROTATABLE BEAM CLAMP

(71) Applicant: UNISTRUT INTERNATIONAL CORPORATION, Harvey, IL (US)

(72) Inventor: Charles O. Nehls, Allen Park, MI (US)

(73) Assignee: Unistrut International Corporation, Harvey, IL (US)

( * ) Notice: Subject to any disclaimer, the term of this patent is extended or adjusted under 35 U.S.C. 154(b) by 0 days.

(21) Appl. No.: 15/864,289

(22) Filed: Jan. 8, 2018

(65) Prior Publication Data

US 2019/0211858 A1    Jul. 11, 2019

(51) Int. Cl.
  *F16B 7/18*   (2006.01)
  *F16B 7/04*   (2006.01)
  *F16B 2/06*   (2006.01)
  *F16M 13/02*  (2006.01)

(52) U.S. Cl.
  CPC .............. *F16B 7/187* (2013.01); *F16B 2/065* (2013.01); *F16B 7/0453* (2013.01); *F16M 13/022* (2013.01)

(58) Field of Classification Search
  CPC ........ F16B 7/187; F16B 2/065; F16B 7/0453; F16B 7/18; F16B 2/02; F16B 2/04; F16B 2/06; F16B 2/12; F16B 7/0493; F16L 3/24; F16M 13/022
  USPC ................. 248/228.1, 228.2, 223.41, 72, 65, 248/228.3–228.6
  See application file for complete search history.

(56) References Cited

U.S. PATENT DOCUMENTS

| | | | | |
|---|---|---|---|---|
| 1,134,519 A | * | 4/1915 | Dietrich | F16L 3/24 248/72 |
| 1,230,441 A | * | 6/1917 | Stevens | F16L 3/24 110/335 |
| 1,281,531 A | * | 10/1918 | Dietrich | F16L 3/24 248/228.5 |
| 1,350,964 A | * | 8/1920 | Friel | E04B 1/4128 248/228.6 |
| 2,375,513 A | * | 5/1945 | Bach | F16L 3/221 248/59 |
| 2,961,269 A | * | 11/1960 | Renfroe | B66C 1/64 248/228.5 |
| 3,784,140 A | * | 1/1974 | Auerbach | F16B 2/10 248/214 |
| 4,852,840 A | * | 8/1989 | Marks | F16B 2/065 248/230.4 |
| 5,775,652 A | * | 7/1998 | Crawshaw | F21V 21/088 248/230.6 |

(Continued)

*Primary Examiner* — Christopher Garft

(57) ABSTRACT

Embodiments of the present disclosure are directed to a support assembly including a set of channel supports directly coupled to a channel member, wherein each of the set of channel supports may include an opening receiving a rotatable member. The rotatable member may extend between each of the set of channel supports. The support assembly may further include a set of beam supports directly coupled to a beam, wherein each of the set of beam supports may engage an upper surface of a flange of the beam. Each of the set of beam supports may include an opening receiving the rotatable member, wherein the rotatable member extends between each of the set of beam supports. In some embodiments, the set of channel supports and the set of beam supports are rotatable relative to one another about a central axis of rotation extending through the rotatable member.

19 Claims, 4 Drawing Sheets

(56) References Cited

U.S. PATENT DOCUMENTS

| | | | |
|---|---|---|---|
| 6,749,361 B2 * | 6/2004 | Hermann | A61B 17/60 248/230.6 |
| 2009/0184222 A1 * | 7/2009 | Osborn | F16B 2/065 248/231.71 |

* cited by examiner

ROTATABLE BEAM CLAMP

FIELD OF THE DISCLOSURE

The present embodiments relate generally to beam clamps and, more particularly, to rotatable beam clamps coupling together a channel member and a beam.

BACKGROUND OF THE DISCLOSURE

Channel members are used as support structures and bracing elements in a variety of applications and industries. Channel members may be produced in a variety of sizes and steel gages depending on the application. Frequently, channel members are formed with holes or slots to facilitate securing sections of one channel member with another channel member, and for securing the channel member to walls and other structures or appurtenances using, for example, threaded rods, washers, nuts and the like. In one approach, an end of a threaded rod can be inserted through a slot in the channel member whereupon a washer and nut are secured to the end thereof. The washer and nut prevent the rod from being withdrawn through the slot in the channel member. The rod can be used to support the channel member from an overhead structure, or it can be used to support an object below. A variety of fittings can be used with channel members to create complex support structures to suit a particular application.

Different types of connectors/adapters are used for coupling together channel members and beams of the overhead structure. Challenges exist, however, when the beams of the overhead structure are sloped. Although current connectors permit rotation to accommodate for sloping beams, these connectors require a threaded rod mounting, thus increasing overall component cost and assembly complexity.

SUMMARY OF THE DISCLOSURE

One or more embodiments of the disclosure may include a rotatable beam connector including a set of channel supports couplable to a channel member. Each of the set of channels supports may include a first section operable to extend along a surface of the channel member, a second section extending from the first section, the second section including an opening receiving a rotatable member, and a set of beam supports coupleable to a beam. Each of the set of beam supports may include an upper section extending along a flange of the beam, and a lower section extending from the upper section, the lower section including an opening receiving the rotatable member.

One or more embodiments of the disclosure may include a support assembly having a set of channel supports coupled to a channel member. Each of the set of channel supports includes a first section extending along a surface of the channel member, and a second section extending from the first section. The second section may include an opening receiving a rotatable member, and a set of beam supports directly coupled to a beam. Each of the set of beam supports may include an upper section engaging an upper surface of a flange of the beam, and a lower section extending from the upper section, the lower section including an opening receiving the rotatable member.

One or more embodiments of the disclosure may include a support assembly having a set of channel supports directly coupled to a channel member. Each of the set of channel supports may include an opening receiving a rotatable member, wherein the rotatable member extends between each of the set of channel supports. The support assembly may further include a set of beam supports directly coupled to a beam, each of the set of beam supports being engaging an upper surface of a flange of the beam, and each of the set of beam supports including an opening receiving the rotatable member, wherein the rotatable member extends between each of the set of beam supports. In some embodiments, the set of channel supports and the set of beam supports are rotatable relative to one another about a central axis of rotation extending through the rotatable member.

Figure 1:
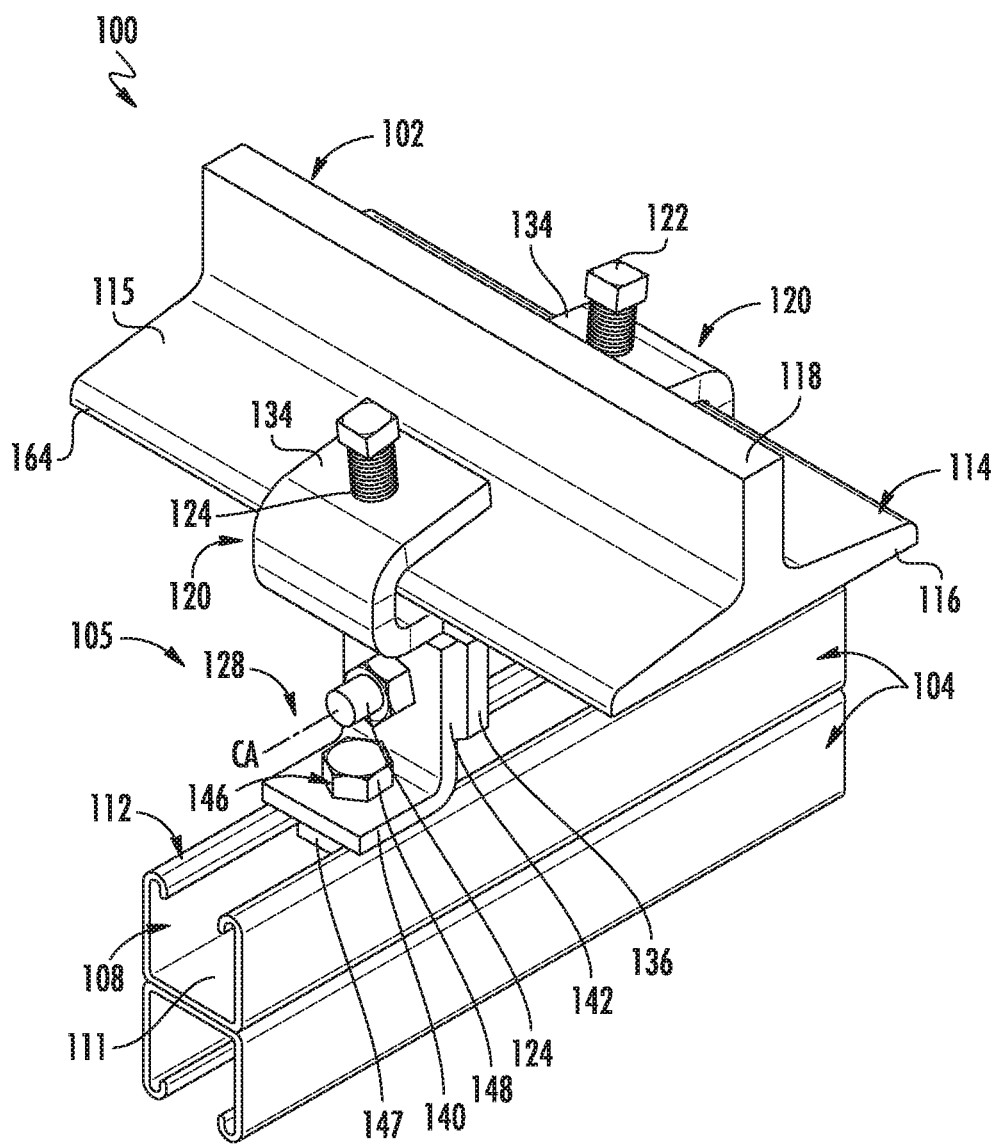
FIG. 1 shows a perspective view of a support assembly in accordance with embodiments of the present disclosure.

The drawings are not necessarily to scale. The drawings are merely representations, not intended to portray specific parameters of the disclosure. The drawings are intended to depict exemplary embodiments of the disclosure, and therefore are not to be considered as limiting in scope. In the drawings, like numbering represents like elements.

Furthermore, certain elements in some of the figures may be omitted, or illustrated not-to-scale, for illustrative clarity. The cross-sectional views may be in the form of "slices", or "near-sighted" cross-sectional views, omitting certain background lines otherwise visible in a "true" cross-sectional view, for illustrative clarity. Furthermore, for clarity, some reference numbers may be omitted in certain drawings.

DETAILED DESCRIPTION

The present disclosure will now be described more fully hereinafter with reference to the accompanying drawings, where embodiments of the retrofit brace fitting assembly are shown. The apparatuses described herein may be embodied in many different forms and is not to be construed as being limited to the embodiments set forth herein. Instead, these embodiments are provided so this disclosure will be thorough and complete, and will fully convey the scope of the apparatus to those skilled in the art.

For the sake of convenience and clarity, terms such as "top," "bottom," "upper," "lower," "vertical," "horizontal," "lateral," and "longitudinal" will be used herein to describe the relative placement and orientation of these components and their constituent parts, each with respect to the geometry and orientation of a component of the retrofit brace fitting assembly as appearing in the figures. The terminology will include the words specifically mentioned, derivatives thereof, and words of similar import.

As used herein, an element or operation recited in the singular and proceeded with the word "a" or "an" is to be understood as including plural elements or operations, until such exclusion is explicitly recited. Furthermore, references to "one embodiment" of the present disclosure are not intended as limiting. Additional embodiments may also incorporating the recited features.

Embodiments of the present disclosure are directed to a support assembly including a set (i.e., one or more) of channel supports directly physically/mechanically coupled to a channel member, wherein each of the set of channel supports may include an opening receiving a rotatable member. The rotatable member may extend between each of the set of channel supports. The support assembly may further include a set of beam supports directly physically/mechanically coupled to a beam, wherein each of the set of beam supports may engage an upper surface of a flange of the beam. Each of the set of beam supports may include an opening receiving the rotatable member, wherein the rotatable member extends between each of the set of beam supports. In some embodiments, the set of channel supports and the set of beam supports are rotatable relative to one another about a central axis of rotation extending through the rotatable member, thus permitting use of the support assembly with a beam that is sloped relative to the channel member.

Although not limited to any particular assembly sequence, during installation, a user may place the beam supports on either side of an I-beam flange. The beam supports are coupled to the channel supports by putting a threaded rod stud through bolt holes in both the set of beam supports and the channel supports. The beam supports are rotated at the desired angle. Nuts are then tightened on the threaded rod, which locks in the desired angle and clamps the beam supports to the side of the I-beam flange. In addition, the beam supports may have serrations on the inside face that makes contact with the I-beam. As the nuts are tightened, the serrations will bite into the I-beam, creating a connection. Set screws are screwed into a tapped hole at the top of the beam supports. This prevents the clamp from sliding down the I-beam when placed at an angle. The channel member can then be attached to the lower portion of the channel supports via a spring nut and bolt. This assembly enables the channel to be directly mounted to the rotating clamp.

Figure 2:
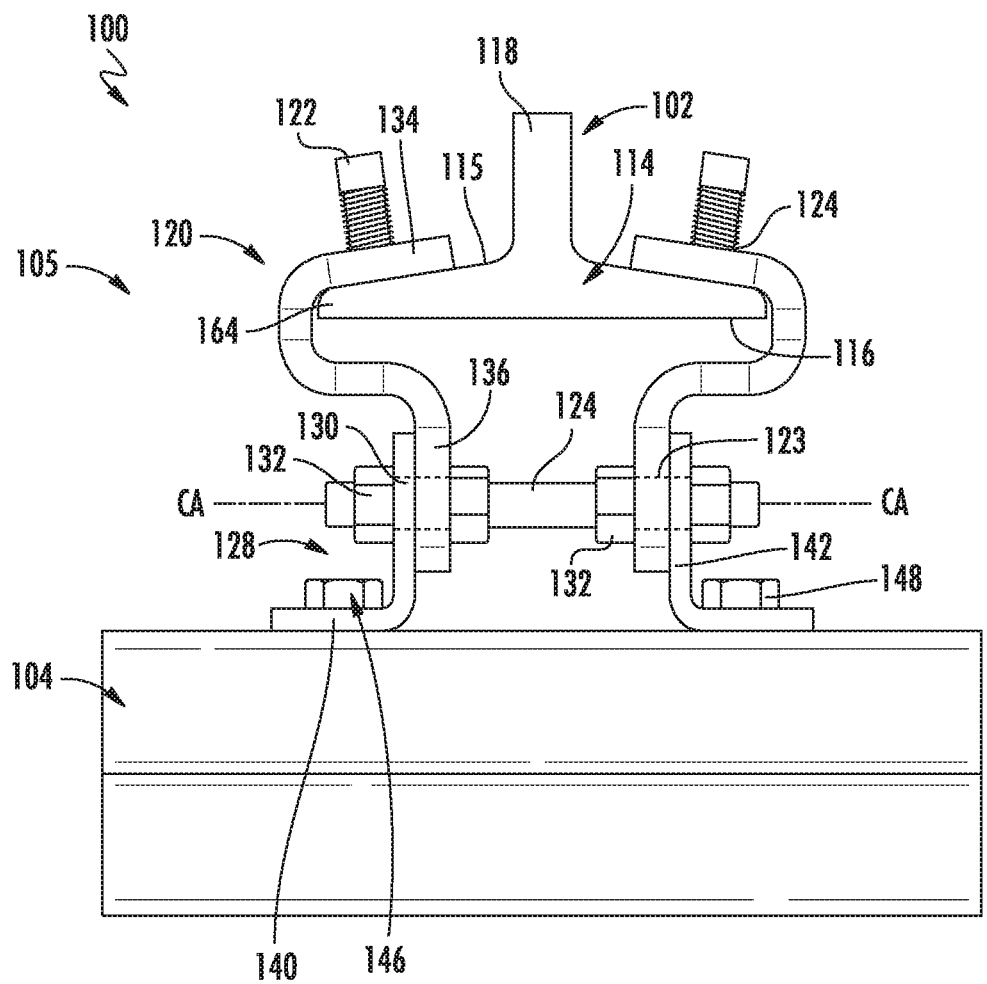
FIG. 2 shows a side view of the support assembly of FIG. 1 in accordance with embodiments of the present disclosure.
Figure 3:
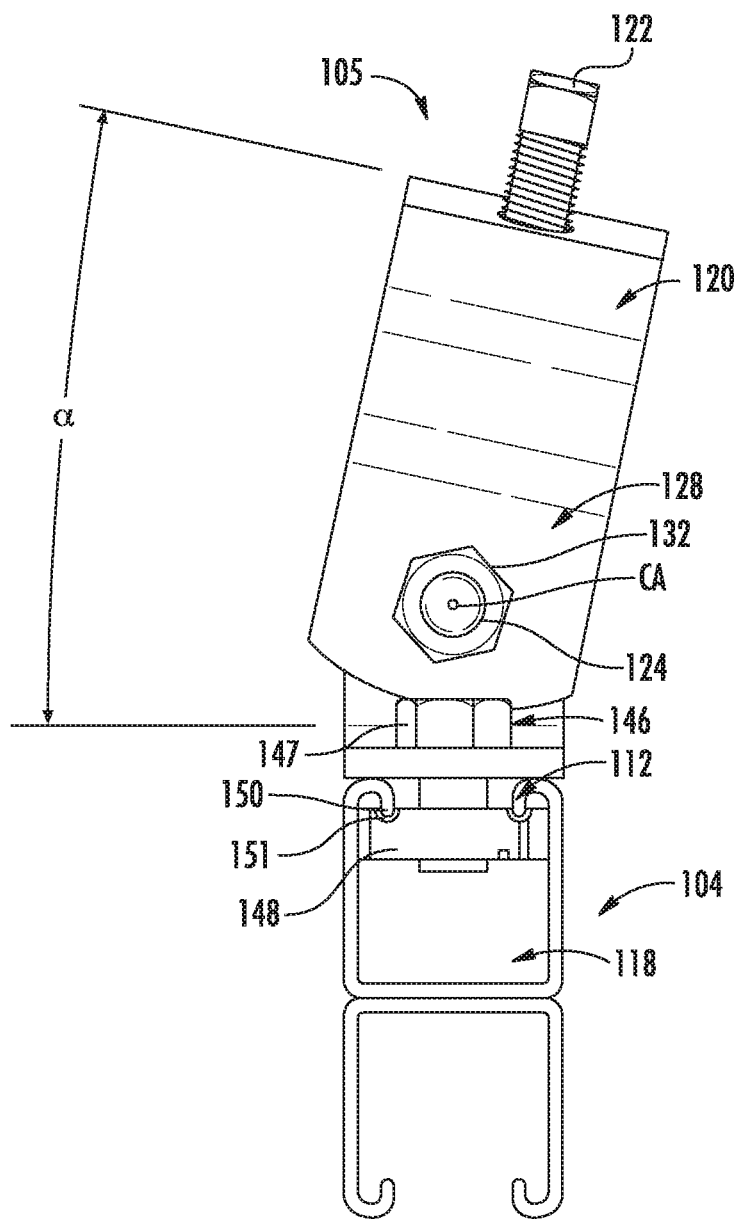
FIG. 3 shows an end view of a portion of the support assembly of FIG. 1 in accordance with embodiments of the present disclosure.

Turning now to FIGS. 1-3, a support assembly 100 (hereinafter "assembly 100") according to various embodiments of the disclosure will be described in greater detail. As shown, the assembly 100 may include a beam 102, such as an I-beam, coupled to one or more channel members 104 by a rotatable beam connector (hereinafter "connector") 105. The channel member(s) 104 may be a generally U-shaped strut or brace member including an interior channel 108, an end wall 111, and a set of turned-in ends 112 at an open side thereof. In the case multiple channel members 104 are combined, such as shown, the end walls 111 of each channel member 104 may be provided directly adjacent one another. However, it'll be appreciated that a variety of configurations are possible in different embodiments.

The beam 102 may include a flange 114 including an upper surface 115 and a lower surface 116, wherein the flange 114 extends outwardly from a web 118 of the beam 102. The dimensions and ratio of the web 118 to the flange 114 can be modified for a particular use (e.g., floor beam versus ceiling beam). Only a lower portion of the beam 102 is shown in FIGS. 1-2 for ease of viewing other components of the assembly 100.

As shown, the connector 105 may include a set of beam supports 120 coupled to opposite sides of the beam 102. The set of beam supports 120 may each include an opening 123 (FIG. 2) receiving a rotatable member 124 (e.g., a pin or stud), which may be cylindrical or tubular shaped. The rotatable member 124 extends between each of the beam supports 120. The connector 105 may further include a set of channel supports 128 directly coupled to the channel member 104. Each of the channel supports 128 may include an opening 130 (FIG. 2) extending therethrough, each of the openings 130 receiving the rotatable member 124. As shown, the rotatable member 124 extends between each of the channel supports 128. A plurality of hexagonal nuts 132 may secure together the channel supports 128, the beam supports 120, and the rotatable member 124. As will be described in greater detail below, the set of channel supports 128 and the set of beam supports 120 are rotatable relative to one another about a central axis 'CA' extending lengthwise through the rotatable member 124.

In some embodiments, the beam supports 120 may include an upper section 134 directly engaged with the upper surface 115 of the flange 114 of the beam 102. One or more set screws 122 may be provided through corresponding set screw openings 124 of the upper section 134 to secure the beam supports 120 to the beam 102. As shown, the upper section 134 may be curved such that the upper section 134 extends along the upper surface 115, and then beneath the flange 114 in a direction substantially parallel to the lower surface 116 of the flange 114. The beam supports 120 may further include a lower section 136 extending from the upper section 134. As shown, the lower section 136 extends downward towards the channel member 104, and includes the opening 122 therein. The lower section 136 may be oriented substantially perpendicular to the rotatable member 124.

The set of channel supports 128 may include a first section 140 extending along a top surface of the channel member 104, and a second section 142 extending from the first section 140. In some embodiments, the first section 140 may directly contact the set of turned-in ends 112. As shown, the first section 140 and the second section 142 may extend substantially perpendicular to one another, while the second section 142 may be directly adjacent and parallel with the lower section 136 of the beam supports 120.

A fastener assembly 146, such as a threaded fastener 147 (e.g., a bolt) and a nut 148, may secure the first section 140 to the channel member 104. As best shown in FIG. 3, the nut 148, which may be located in the interior channel 108, may be threadingly coupled to the threaded fastener 147 and in abutment with the set of turned-in ends 112. A free end 150 of the set of turned-in ends 112 may engage a recess 151 of the nut 148 to align and better secure the nut 148 to the channel member 104.

In exemplary embodiments, the beam 102 and the channel member 104 extend substantially perpendicularly to each other. For example, a lengthwise beam axis of the beam 102 may cross over a lengthwise channel axis of the channel member 104. In structures with sloped ceilings, the set of beam supports 120 may rotate at an angle α relative to the channel member 104 and to the ground (not shown). Although not limited to any specific number, in some embodiments the angle α may have an upper limit of approximately 18 degrees.

Figure 4:
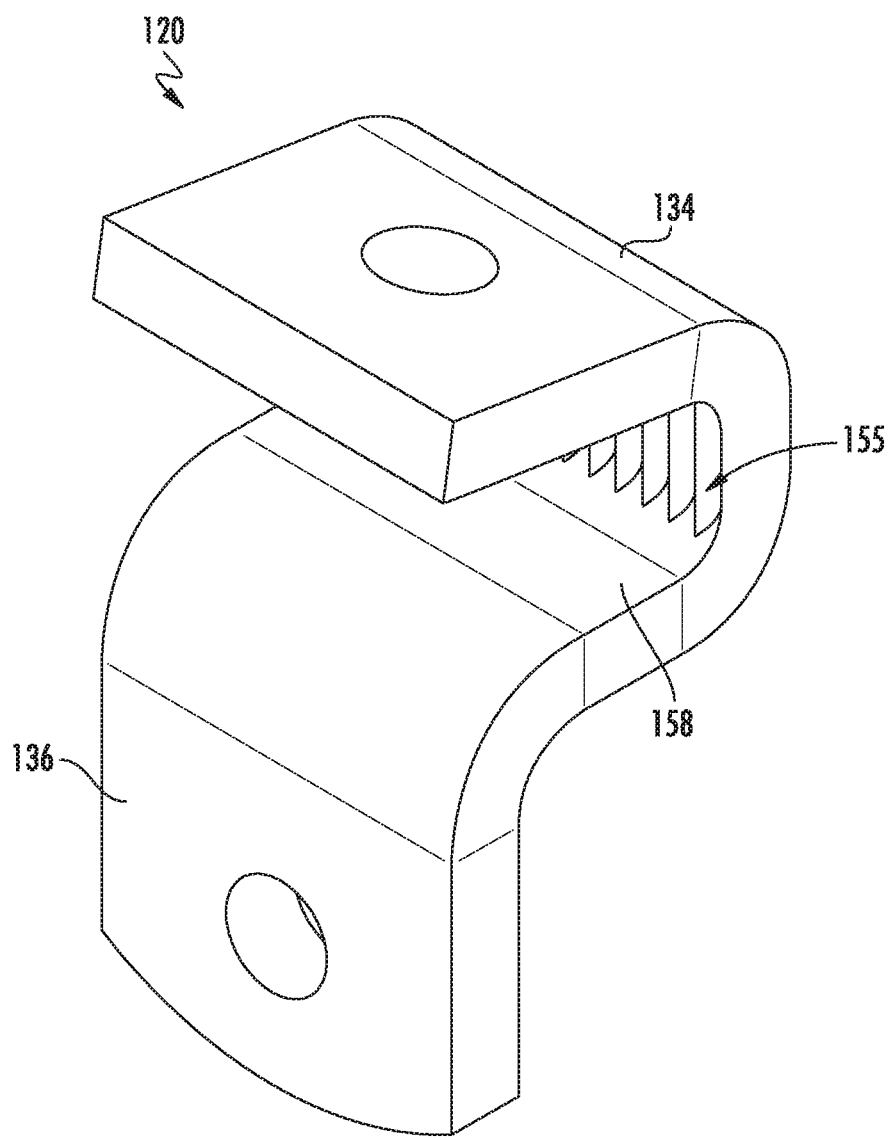
FIG. 4 shows a perspective view of one of the beam supports of the support assembly of FIG. 1 in accordance with embodiments of the present disclosure.

As shown in FIG. 4, to help maintain the position of the set of beam supports 120 on the beam 102, the upper section 134 may include one or more protrusions 155 formed on an interior surface 158 thereof. The protrusions 155 may be a series of teeth or serrations that grab/engage an outer portion 164 of the flange 114 of the beam 102 (FIGS. 1-2) to help prevent slippage between the set of beam supports 120 and the beam 102 due to the angle of the beam 102. A higher load capacity may therefore be achieved.

As will be appreciated, a number of advantages are provided by the embodiments of the present disclosure. Firstly, the rotatable beam clamp ensures that the channel member installation can remain level even when the ceiling is not. Secondly, the serrated protrusions on the set of beam supports minimize slippage, thus allowing for higher load capacity in certain loading scenarios, for example, when the beam is sloped relative to the channel member. Thirdly, the set of beam supports may also have set screws that prevent the clamp from sliding down the flange of the beam, further increasing load capacity.

While certain embodiments of the disclosure have been described herein, the disclosure is not limited thereto, as the disclosure is as broad in scope as the art will allow and the specification may be read likewise. Therefore, the above description is not to be construed as limiting. Instead, the above description is merely as exemplifications of particular embodiments. Those skilled in the art will envision other modifications within the scope and spirit of the claims appended hereto.

The invention claimed is:

1. A rotatable beam connector assembly, comprising:
    a set of L-shaped channel supports coupled to a channel member, wherein the channel member is a U-shaped channel member including an interior channel, an end wall, and a set of turned-in ends at an open side thereof, each of the set of L-shaped channel supports comprising:
        a first section in direct physical contact with an exterior surface of the set of turned-in ends of the channel member, the first section extending over the interior channel; and
        a second section extending perpendicularly from the first section, the second section including an opening receiving a rotatable member; and
    a set of beam supports coupled to a beam, each of the set of beam supports comprising:
        an upper section comprising:
            a first part extending along an upper surface of a flange of the beam; and
            a second part extending from the first part, the second part oriented parallel to a web of the beam, and the second part including a plurality of serrated protrusions extending from an inner surface, wherein the plurality of serrated protrusions grip the flange to provide slip resistance between the flange and the second part; and
        a lower section extending from the upper section, the lower section including an opening receiving the rotatable member,
    wherein the set of beam supports is fixed at a non-zero angle of inclination with respect to a perpendicular to a plane of an end wall of the channel member.

2. The rotatable beam connector assembly of claim 1, wherein the set of L-shaped channel supports and the set of beam supports are rotatable relative to one another about a central axis of rotation extending through the rotatable member.

3. The rotatable beam connector assembly of claim 1, wherein the first section extends across the open side of the channel member, between each of the set of turn-in ends, and wherein the first section is positioned above the channel member.

4. The rotatable beam connector assembly of claim 3, further comprising a fastener assembly securing the first section to the channel member.

5. The rotatable beam connector assembly of claim 4, the fastener assembly comprising:
    a threaded fastener extending through the first section; and
    a nut threadingly coupled to the threaded fastener, wherein the nut is disposed within the interior channel, and wherein the nut is in abutment with a free end of each of the set of turned-in ends.

6. The rotatable beam connector assembly of claim 1, further comprising a set screw extending through a set screw opening of the upper section.

7. The rotatable beam connector assembly of claim 1, wherein the second section extends parallel to the lower section.

8. The rotatable beam connector assembly of claim 7, wherein the second section and the lower section are directly adjacent one another.

9. The rotatable beam connector assembly of claim 1, wherein the first part of the upper section directly mechanically engages the upper surface of the flange, and wherein the upper section extends beneath the flange in a direction substantially parallel to a bottom surface of the flange.

10. The rotatable beam connector assembly of claim 1, wherein the beam is an I-beam oriented substantially perpendicularly to the channel member.

11. A support assembly comprising:
    a set of L-shaped channel supports coupled to a U-shaped channel member, the U-shaped channel member including an interior channel, an end wall, and a set of turned-in ends at an open side opposite the end wall, each of the set of channel supports comprising:
        a first section in direct physical contact with an exterior surface of the set of turned-in ends of the channel member, the first section extending over the interior channel;
        a second section extending perpendicular from the first section, the second section including an opening receiving a rotatable member; and
    a set of beam supports directly coupled to a beam, each of the set of beam supports comprising:
        an upper section comprising:
            a first part extending along an upper surface of a flange of the beam; and
            a second part extending from the first part, the second part oriented parallel to a web of the beam, and the second part including a plurality of serrated protrusions extending from an inner surface, wherein the plurality of serrated protrusions grip the flange to provide slip resistance between the flange and the second part; and
        a lower section extending from the upper section, the lower section including an opening receiving the rotatable member,
    wherein the set of beam supports is fixed at a non-zero angle of inclination with respect to a perpendicular to a plane of an end wall of the channel member.

12. The support assembly of claim 11, wherein the set of L-shaped channel supports and the set of beam supports are rotatable relative to one another about a central axis of rotation extending through the rotatable member.

13. The support assembly of claim 11, wherein the first section extends across the open side of the channel member, between each of the set of turn-in ends, and wherein the first section is positioned above the channel member.

14. The support assembly of claim 13, further comprising a fastener assembly securing the first section to the U-shaped channel member, wherein the fastener assembly includes a threaded fastener and a nut threadingly coupled to the threaded fastener, and wherein the nut is disposed within the interior channel and in abutment with a free end of each of the set of turned-in ends.

15. The support assembly of claim 11, further comprising a set screw extending through a set screw opening of the upper section, the set screw engaging the upper surface of the flange of the beam.

16. The support assembly of claim 11, wherein the second section extends parallel to the lower section, and wherein the second section and the lower section are directly adjacent one another.

17. The support assembly of claim 11, wherein the upper section extends beneath the flange in a direction substantially parallel to a bottom surface of the flange.

18. A support assembly comprising:
- a set of L-shaped channel supports directly physically coupled to a U-shaped channel member, the U-shaped channel member including an interior channel, an end wall, and a set of turned-in ends at an open side opposite the end wall, wherein each of the set of L-shaped channel supports includes an opening receiving a rotatable member, wherein the rotatable member extends between each of the set of L-shaped channel supports, and wherein each of the set of L-shaped channel supports comprises:
  - a first section in direct physical contact with an exterior surface of the set of turned-in ends, the first section extending over the interior channel;
  - a second section extending perpendicular from the first section, the second section including the opening receiving the rotatable member; and
- a set of beam supports directly physically coupled to a beam, each of the set of beam supports engaging an upper surface of a flange of the beam, and each of the set of beam supports including an opening receiving the rotatable member, wherein the rotatable member extends between each of the set of beam supports,
- wherein an upper section of each of the set of beam supports comprises:
  - a first part extending along the upper surface of the flange of the beam; and
  - a second part extending from the first part, the second part oriented parallel to a web of the beam, and the second part including a plurality of serrated protrusions extending from an inner surface, wherein the plurality of serrated protrusions grip the flange to provide slip resistance between the flange and the second part, and
- wherein the set of channel supports and the set of beam supports are rotatable relative to one another about a central axis of rotation extending through the rotatable member to cause the set of beam supports to be fixed at a non-zero angle of inclination with respect to a perpendicular to a plane of an end wall of the channel member.

19. The support assembly of claim 18, further comprising a set screw extending through a set screw opening of the upper section, the set screw engaging the upper surface of the flange of the beam.

* * * * *